United States Patent [19]
Vernon et al.

[11] 3,787,138
[45] Jan. 22, 1974

[54] SPINDLE MOUNTED PERSONNEL PROTECTOR

[75] Inventors: John Pershing Vernon; Douglas Wayne Lamkins, both of Springfield, Mo.

[73] Assignee: Litton Systems, Inc., Springfield, Mo.

[22] Filed: Aug. 23, 1972

[21] Appl. No.: 283,107

[52] U.S. Cl............................ 408/241 G, 145/116 A
[51] Int. Cl............................................. B23b 47/00
[58] Field of Search.. 408/241 G, 241 R; 145/116 A

[56] References Cited
UNITED STATES PATENTS
1,597,176   8/1926   Bresser............................ 145/116 R
FOREIGN PATENTS OR APPLICATIONS
571,794   9/1945   Great Britain....................... 408/112
OTHER PUBLICATIONS
American Machinist, "Safety Devices," pp. 134–136, May 10, 1945.

*Primary Examiner*—Leonidas Vlachos
*Attorney, Agent, or Firm*—Ronald M. Goldman

[57] ABSTRACT

A spindle mounted personnel protector provides a barrier for a rotating drill chuck which prevents an operator's hair or other objects from becoming entangled with such a rotating part, while permitting full view of the work. This includes a hollow elongated cylinder of transparent plastic material which fits over and ensleeves the drill chuck. The cylinder contains a groove in its outer surface proximate the upper end of the cylinder and such groove extends about the circumference of the cylinder. A set of three mounting brackets are evenly spaced about and are attached to the drill housing, a non-rotating element of a drill press. The brackets each extend to beneath the housing and each includes a radially inwardly projecting prong. The prongs engage the groove in the plastic cylinder to thereby support the cylinder in place. The plastic cylinder is easily removed by downwardly pulling upon an end of same, as would be done when it is desired to change drill bits, and is easily reinserted into place by simply pushing upward on the bottom end until the bracket prongs re-engage in the groove of the plastic cylinder.

1 Claim, 3 Drawing Figures

PATENTED JAN 22 1974  3,787,138
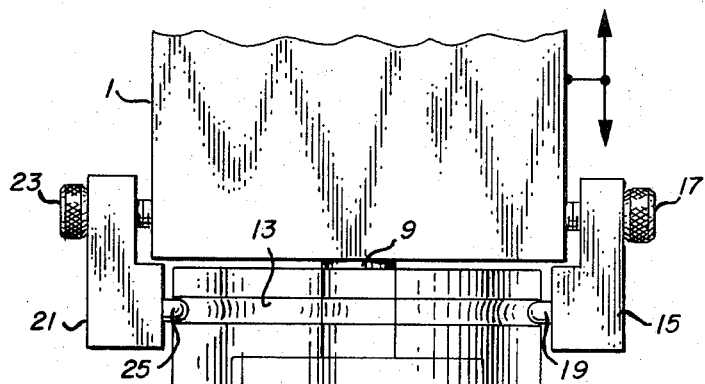
Fig_1
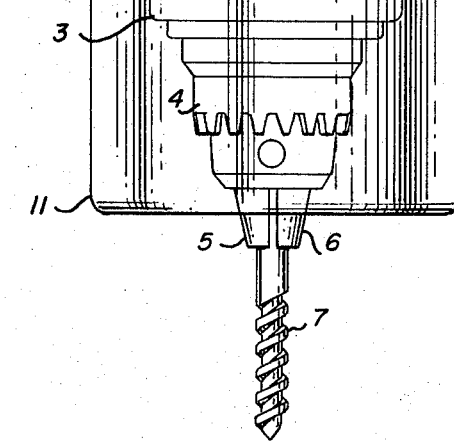
Fig_2
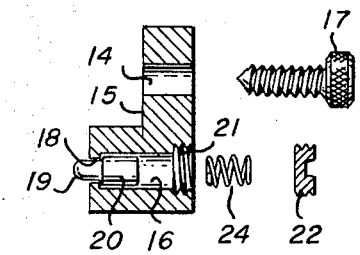
Fig_3

SPINDLE MOUNTED PERSONNEL PROTECTOR

FIELD OF THE INVENTION

This invention relates to protective devices for machinery and, more particularly, to a personnel protector adapted to prevent contact between an operator or the operator's apparel and any portion of a rotating drill chuck.

BACKGROUND OF THE INVENTION

Industrial concerns employ large quantities of fabricating machines of various types, one of which is the drill press. The drill press includes a head or chuck, as variously termed, which extends on a shaft from a drill housing, and the chuck supports an extending drill bit. In use the chuck is lowered while rotating and the rotating drill engages the work. The chuck is lowered until a hole is drilled in the work. It is desirable to employ procedures and devices which minimize or eliminate the possibility of an operator or anyone else in the vicinity of the machine from sustaining injury due to contact with moving machinery; and various protective devices are in current use for that purpose. The operator may feed in or remove work from a drill press as well as operate the drill. On occasion an operator may be moving back and forth between drill presses, inserting and removing work from a large number of drill presses. Without a protective device to form a barrier between the rotating chuck of the drill and the operator, potential hazard exists should the operator inadvertently touch the rotating part or should some portion of the operator's long hair or apparel become snagged in a rotating drill chuck.

Previously, protective devices proposed for drill presses included a metal shield that was fastened to the non-rotating drill housing. Such a metal shield, while effective to prevent contact with rotating machinery, obscured the operator's view of the work. To allow the operator to regain the advantage of observing the work in progress, the shield was partially cut away in front. However, by cutting away a front portion of the shield, some measure or degree of protection is obviously lost.

OBJECTS OF THE INVENTION

Accordingly, it is an object of the invention to provide a novel protective barrier for preventing accidental contact with rotating machinery.

It is an additional object of the invention to provide a protective shield of novel construction which prevents an operator from coming into contact with the rotating drill chuck without obscuring the operator's vision of the work.

It is still another object of the invention to provide a protective shield for a drill chuck which is simple to manufacture, inexpensive, and which may be easily installed, removed and reinserted into place on the drill press.

SUMMARY OF THE INVENTION

In accordance with the foregoing objects the invention includes a hollow cylinder of trasnparent plastic material having an inner diameter sufficiently large so as to permit the drill chuck to fit therewithin and of a length sufficient to extend the entire length of the drill chuck or, if desired, down to a portion of the drill bit. The cylinder contains a groove in its outer surface proximate the top end. Suitably the groove extends around the entire circumference of the cylinder. A series of mounting brackets are adapted to be attached about the periphery of the non-rotating drill housing and each of these brackets includes an extending prong. As mounted, the prongs face inwardly toward the drill chuck and they are spaced about the drill housing so that the prong fits within the groove and supports in place the plastic cylinder. In accordance with an additional aspect of the invention, the prongs are spring-loaded and are slideably movable. Accordingly, when it be desired to remove the plastic cylinder, a pulling force on the cylinder forces the prongs against their respective springs and allow the prongs to slip out of the groove to permit extraction of the plastic cylinder. In like manner, the plastic cylinder is simply inserted into place by pushing on the cylinder. The outer cylinder wall forces the prongs to move back partially into the respective mounting bracket until the plastic cylinder is inserted sufficiently to line up the prong with the groove, whereupon the prongs spring forward into place within the groove to retain the plastic cylinder.

The foregoing and other objects and advantages of the invention, as well as the elements comprising the invention and equivalent and substitute elements therefor, become more apparent and are better understood from consideration of the detailed description of a preferred embodiment of the invention which follows, taken together with the figures of the drawings.

DESCRIPTION OF DRAWINGS

FIG. 1 illustrates an embodiment of the invention;

FIG. 2 illustrates the transparent plastic cylinder in perspective which is employed in the embodiment of FIG. 1; and FIG. 3 illustrates in cross-section and partially exploded view, a mounting means used in the preferred embodiment of FIG. 1.

DETAILED DESCRIPTION OF THE INVENTION

A section of a drill press is illustrated in FIG. 1. This includes the drill housing 1 and the drill head 3, which contains the drill chuck 4. The drill chuck includes a set of jaws, including jaws 5 and 6, which clamp and hold in place a drill 7. Drill head 3 is supported within drill housing 1 by a shaft 9. These and other elements of a drill press are conventional and are well-known to those skilled in the art so that they are not here illustrated or described further. As is conventional, the drill head 1 is a non-rotatable part; however, drill head 1 is movable up and down as is indicated by the arrows in the drawing in order to raise and lower drill 7. The housing 1 thus carries the drill head 3 up and down as desired. Through other conventional mechanisms and shaft 9, the drill head 3 is rotated.

A hollow transparent plastic cylinder 11 is of a length sufficient to extend between non-rotatable drill housing 1 to the end of the drill chuck and therewith forms a barrier. The inner diameter of cylinder 11 is sufficiently large to permit the drill chuck to fit therewithin. A groove 13 is located in the outer surface of the plastic cylinder proximate the upper end located near housing 1. In this embodiment, the groove extends around the entire periphery. However, as becomes apparent, other modifications may be made so that only a series of indentations or series of grooves is all that is necessary.

A first mounting bracket 15 is of an L-shaped geometry. A bolt 17 which extends through a passage in the bracket, not illustrated, attaches mounting means 15 to housing 1. The mounting bracket is seen to include a slender portion and a projecting portion which extends beneath the housing so as to provide a secure connection and prevent rotation or tilting of the mounting 15. A projecting finger or prong 19 extends from the mounting bracket and engages the groove 13 in the plastic cylinder. As hereinafter explained, the prong 19 is preferably slideably mounted and spring-loaded. A second like mounting bracket 21 of the same construction is provided as well as a mounting bolt 23 and an extending prong 25. And a third mounting bracket, not visible in the figure, of like construction as the preceding brackets, is likewise mounted to housing 1 and contains a projecting support finger which engages the groove 13 in cylinder 11.

A minimum of three extending prongs is necessary to support the plastic cylinder. Hence at least three such mounting brackets and extending prongs are located equally spaced, 120°, about the circumference of the housing 1 to provide a very stable support. For clarity of illustration in the figure it is noted that bracket 21 is positioned a greater angular distance than 120° from bracket 15.

FIG. 2 illustrates to a slightly reduced scale and in perspective, the transparent plastic cylinder 11 illustrated in the embodiment of FIG. 1. For convenience, those elements of the invention previously referred to and labeled in FIG. 1 are given the same numerical designation as those elements again appear in this FIG. 2 and in the remaining FIG. 3 of the drawings. The groove 13 is located at the upper end of the cylinder 11 and extends in a circle around the cylinder. In the preferred embodiment of the invention of FIG. 1, mounting prongs 19 and 25 are spring-loaded and slideably mounted in the respective mounting bracket. Thus it is preferable for the cylinder 11 to be of such wall thickness as to be substantially rigid. This is, of course, a matter of degree and preference however and, should it be desired, the walls of the cylinder can be somewhat resilient so that they deform upon insertion into the mounting brackets and then restore to the normal cylindrical shape when groove 13 is aligned to the projecting mounting prongs. In the latter alternative it is apparent that the prongs such as 19 and 25 in FIG. 1 need not be slideable in the mounting bracket but instead may be rigidly fixed in position. The preferred angular orientation of the projecting prongs 19, 25 and 26 of the three support brackets are illustrated by the dash radial lines in FIG. 2.

The cross-section of one of the mounting brackets, 15, used in the preferred embodiment of FIG. 1 is illustrated in FIG. 3. This shows the L-shaped bracket to contain two passages, 14 and 16. Mounting screw 17 is shown in exploded view removed from its position within passage 14. As is revealed in this figure, the prong 19 includes a body portion of slightly enlarged diameter as at 20. Passage 16 has a reduced diameter front end, as at 18, which is less than the diameter of the section 20 of the prong but which allows the tip end to project therethrough and which prevents the prong from falling out entirely. Passage 16 includes an enlarged diameter portion containing threads, 20, which forms a recessed hole for a flush fit plug, 22, shown in exploded view. A spring, 24, also shown in exploded view, is inserted into the passage 16 and abuts the end of prong 19 and plug 22 when assembled together so that the spring 24 maintains an outwardly directed force on prong 19. At the same time, prong 19 is slideably mounted and can be moved back against the bias of spring 24 by the application of a suitable force to the front end of the prong.

Reference is again made to FIG. 1 which shows the protective cylinder 11 in position of the drill press housing. Should it be desired to change drills 7, it is necessary to remove the protective cylinder 11 to provide access to the chuck portion 4 by simply grasping an end of the cylinder and tugging downwardly on same. The upper wall of groove 13 exerts a force on the respective prongs 19 and 25 and pushes them radially outward against the bias of the respective internally located springs. With sufficient force, prongs 19 and 25 are pushed entirely out of the groove and the cylinder is slid out of position. Likewise, the reinstallation of the cylinder 11 is relatively simple. The cylinder is oriented with the grooved end 13 located on top, and the cylinder is slipped over the drill and drill head 3 until the top edge engages prongs 19 and 25. By pushing somewhat harder, the upper edge of cylinder 11 forces prongs 19 and 25 outwardly sufficient to permit the upper end to be slid into contact with housing 1 or until groove 13 is aligned with prongs 19 and 25. At this position the prongs 19 and 25 slide radially inwardly and snap into position in groove 13.

As the foregoing description makes clear, the protective barrier of the invention is relatively simple in construction and mounts easily to any conventional drill press. The plastic cylinder 11 completely surrounds most of the rotating elements of the drill press and thus prevents any articles of clothing or hair or body appendages from coming into contact or snagging upon the rotating drill head 3, chuck 4, or jaws 5 and 6 at any and all positions. Moreover the transparency permits the operator to maintain the work in full view from any position at all times. Thirdly, it is a relatively simple matter to remove or insert the plastic cylinder 11 from its position on the drill housing in order to make any adjustment or change in the drill. In this latter connection, it is noted that only a small portion of groove 13 is actually utilized in cooperating with prongs such as 19 and 25. It thus seems apparent that an obvious modification would be to merely make a series of indentations or grooves of small length which are located at positions on the outer surface of cylinder 11 in alignment with the positions of the prongs of mounting means such as 15 and 21. While such forms a satisfactory device within the spirit of my invention, it is noted that where such a construction is employed, the operator in reinserting the plastic cylinder 11 into position must visually line up such series of indentations to correspond in position with that of the prongs on the mounting means and to maintain such alignment while pushing cylinder 11 upward into place. In providing a continuous groove 13 surrounding the entire outer surface of cylinder 11, the necessity for maintaining any alignment during reinsertion is entirely avoided and in effect the plastic cylinder 11 may be pushed upward into place with the installer's eyes closed.

The foregoing description of a preferred embodiment of my invention is presented in order to enable one skilled in the art to make and use the invention and not by way of limitation, inasmuch as many substitutions and equivalents as well as modifications and improvements to the invention suggest themselves to those skilled in the art upon reading this specification. Accordingly, it is expressly understood that the invention is to be broadly construed within the spirit and scope of the appended claims.

What we claim is:

1. In a drill press assembly having a stationary drill housing member and a rotatable drill head located beneath said drill housing member, the combination comprising:

three bracket members equally spaced from one another about the periphery of said housing member and fixedly mounted to said housing member, each of said brackets having an upper portion positioned at said housing member and a lower portion positioned below said housing member;

said lowermost portion of each said bracket containing: a passage with an opening thereto facing said drill head, a prong means supported in said passage and moveable along said passage and having a rounded end projecting from said opening in said passage, and spring means positioned in said passage for biasing said prong means outwardly; wherein three reciprocally moveable prong means are directed radially toward said drill head and wherein sufficient upward or downward force on the rounded end of said prong means causes said prong to move into said bracket passage;

a hollow rigid cylinder of transparent plastic material, said hollow cylinder having an inner diameter greater than the outer diameter of said drill head to surround without touching said rotatable drill head and being of a length greater than the length of said drill head to form an optically transparent physical barrier around said drill head;

a continuous groove having a rounded cross-sectional geometry located in the outer surface of said cylinder proximate the upper end thereof, said groove encircling the cylindrical outer periphery of said cylinder;

and each of said three prong means having its rounded end engaging said groove to support and maintain in place said plastic cylinder in a position surrounding said rotatable drill head;

whereby said plastic cylinder is easily removed by tugging downwardly on said cylinder and is easily reinstalled in place by pushing said cylinder upwardly to force said prongs out of or into said groove, respectively.

* * * * *